United States Patent Office 2,758,983
Patented Aug. 14, 1956

2,758,983

COATING COMPOSITIONS COMPRISING METALLIC DUST

Harry A. Toulmin, Jr., Dayton, Ohio, assignor to Midland Chemical Corporation, a corporation of Delaware No Drawing. Application May 11, 1953, Serial No. 354,373

2 Claims. (Cl. 260—40)

This invention relates to new compositions comprising alkyd resins and metallic dust and adapted for use as protective coating materials and as molding compositions.

One object of this invention is to provide new compositions which can be applied to metal surfaces or the like for protective, anti-corrosion purposes and polymerized or cured after deposition on the base.

Another object is to provide compositions which, after deposition and hardening thereof on a metal surface or base, provides the latter with a hard, durable protective film or coating comprising metallic particles imbedded in a thermoset resin matrix. A further object is to provide compositions which can be molded into shaped objects having a metallic effect.

These and other objects are accomplished by providing new polymerizable coating compositions comprising a liquid polyester resin, a polymerizable vinyl-substituted heterocyclic tertiary amine, and metallic particles.

The polyester component of the composition is an alkyd resin, or more properly, an alkyd resin precondensate, the term alkyd resin as used herein including unmodified and modified polyhydric alcohol polyesters of alpha unsaturated-alpha-beta-polycarboxylic acids. Typical of the polyhydric alcohols used in making such resins are ethylene glycol, di-, tri-, and tetra-ethylene glycol, propylene glycol, dipropylene glycol, trimethylene glycol, glycerol and pentaerythritol. Examples of the alpha-unsaturated-alpha-beta polycarboxylic acids are maleic, fumaric, chlormaleic chlorofumaric, citraconic, methylethyl maleic, diethyl maleic, chloromethyl maleic and mesaconic acids. In making the unmodified alkyd or polyester resins, one or more of the foregoing alcohols is heated with a roughly equivalent proportion of one or more of the acids, their anhydrides, or compounds which liberate the acids for a time sufficient to effect condensation to the stage at which the condensate occurs as a liquid, resinous polyester. In making the modified alkyd resins, a part, or even nearly all, of the unsaturated polycarboxylic acid may be substituted by saturated mono- or polycarboxylic acid, such as succinic, adipic, phthalic, sebacic or 12-hydroxystearic acids. Monobasic acids having from 10–20 carbons may be preferred. These acids may be mixed fatty acids derived from vegetable oils or the individual acids present therein. When desired, the vegetable oils themselves may be incorporated by conventional methods, e. g., by the so-called "alcoholysis" method. As examples of vegetable oils may be mentioned linseed oil, perilla oil, soybean oil, castor oil, dehydrated castor oil, palm kernel oil, cocoanut oil and the like. Such resins, both of the unmodified and modified type are known in the art and available commerically under a variety of trade-names.

The alkyd or polyester resin is made up of repeating groupings containing alcohol and acid units and may have a molecular weight, as measured by the acid value of the resin, of over 500, molecular weights of 1000 or over being generally preferred. The molecular weight should be such that the liquid resin is capable of being blended uniformly with the vinyl-substituted heterocyclic tertiary amine in conventional-type mixing apparatus.

Examples of the vinyl-substituted heterocyclic tertiary amines which may be used include the vinyl pyridines, for instance, 2-vinylpyridine, 5-vinyl-2-methylpyridine, 5-ethyl-2-vinylpyridine, and the vinylpyridines and their alkyl nuclearly substituted derivitatives generally in which the alkyl radicals contain from 1 to 4 carbon atoms, the vinylimidazoles, the vinylquinolines, the vinyl-isoquinolines, the vinylthiazoles, the vinyl oxazoles, the vinyl benzo-oxazoles, etc.

The particulate metal may be zinc, aluminum, titanium, magnesium, zirconium or lithium particles having a diameter between about 0.5 and 3.0 microns (sub-sieve determination).

The compositions of the invention may be prepared by mixing or blending the polymerizable, preferably monomeric, vinyl-substituted heterocyclic tertiary amine with the liquid resinous polyester, and then adding the metallic particles to the mixture, with stirring. The metallic particles tend to remain suspended in the resinous liquid blend.

In these compositions, the vinyl-substituted heterocyclic tertiary amine functions, initially, as a diluent for the polyester. On heating of the mix to curing temperature, the amine serves as a cross-linking agent for the polyester molecules to form a web-like structure. The curing or hardening to thermoset condition with simultaneous cross-linking of the polyester molecules by the vinyl-substituted amine and polymerization of the latter, are best accomplished in the presence of a catalyst. A latent catalyst may be incorporated in the mix during initial blending, or the catalyst may be mixed with the blend immediately prior to use thereof. Catalysts which may be added to the composition include the organic peroxides such as benzoyl peroxide, succinic peroxide, and especially those peroxides made from fatty acids having from 10 to 20 carbons atoms, including lauroyl, stearoyl, and the peroxides made from vegetable oil acids such as cocoanut oil peroxides. Alcohol peroxides such as tertiary butyl hydroperoxide and terpene oxides, e. g., ascaridole may also be used. Normally, the catalyst may be used in small amounts of from 1.1 to about 2% of the composition by weight.

If the composition is to be stored for long time periods, it is generally desirable to include a polymerization inhibitor with it. Guaiacol, paraquinone, paratertiary butylalcohol, hydroquinone, ortho-trinitro phenols and the like are suitable inhibitors and may be used in amounts between 0.2% to 1.0% by weight of the composition to inhibit or retard polymerization for substantial periods of time.

The relative proportions of the polyester and vinyl-substituted heterocyclic tertiary amine may be rather widely varied and may be such that the blend comprises from 5 to 50 parts of the vinyl-substituted heterocyclic tertiary amine, e. g., a vinylpyridine such as 2-vinylpyridine or 5-vinyl-2-methylpyridine for each 100 parts of the polyester. The amount of metallic dust used in the compositions may range from about 5 lbs. to 18 lbs. thereof per gallon of the blend of polyester and amine, these amounts being illustrative and subject to selection and variation depending on the purpose for which the composition is intended and the effect to be achieved. When the composition is to be used as a protective coating, a comparatively heavy concentration of the metallic dust generally will be found desirable.

Preferred compositions of the invention are those which comprise the vinyl-substituted heterocyclic tertiary amine and a resinous liquid polyester obtained from the glycol, e. g., propylene glycol and a mixture of an unsaturated dicarboxylic acid and a saturated dicarboxylic acid or the corresponding acid anhydrides. Typical is a mixture of maleic and phthalic acids, of maleic and phthalic anhydrides, or of maleic and tetrahydro phthalic anhydrides. Particularly preferred may be the polyesters obtained from mixtures of the saturated and unsaturated acids (or their anhydrides) in which the molecular ratio of saturated acid to unsaturated acid is not greater than 60:40. The mixtures may desirably comprise the acids (or anhydrides) in such proportions that the mole ratio of saturated acid to unsaturated acid is 10:90, 25:75 or 50:50. Polyesters formed from mixed saturated and unsaturated acids in which the saturated acid is phthalic acid (or the anhydride) are especially useful.

The polyester of the composition may be one which has been modified by including with the polyester-forming constituents an alcohol having a terminal $CH_2=C$ group, including allyl alcohol and others of that class having from 3–10 carbon atoms. This includes methallyl alcohol, methyl vinyl carbinol, allyl ethyl alcohol, monoallyl and monomethallyl ethers of ethylene glycol and the like. Such modified polyesters are known and contain, in addition to the acid and polyhydric alcohol, residues of the unsaturated alcohol.

The polyester may also be one produced in the presence of a monohydric aliphatic alcohol such as 1-butanol, and other saturated lower aliphatic alcohols having straight or branched chains, particularly alcohols having 3–6 carbon atoms such as propanol, 1-pentanol, 2-methyl-1-butanol, 2-pentanol, 2-methyl-2-butanol, 2-propanol, 2-butanol, 2-methyl-2-propanol and the like. The final polyester may, therefore, also contain residues of the saturated monohydric alcohol, preferably in an amount up to 1–10% of the total ester linkages.

One of the distinguishing features of the blends of this invention is that the vinyl-substituted heterocyclic tertiary amines are strongly receptive of the acid dyestuffs which permits coloring of the blend as a whole by such dyes as a result of the occurrence of the vinyl-substituted tertiary amine homogeneously throughout the blend, and without the addition of dyes to the blend during mixing thereof. Various dyes and pigments may be incorporated, if desired, however.

It is to be noted that although the polyester may be prepared by reacting substantially equivalent parts of the polyhydric alcohol and polycarboxylic acid, variations in the properties of the polyesters may be achieved not only by conducting the esterification reaction in the presence of unsaturated allyl-type alcohols and/or saturated monohydric alcohols, but also by variations in the relative proportions of the primary reactants, and particularly by selecting those reactants so that there is a slight preponderance of either the polycarboxylic acid or the polyhydric alcohol.

The following examples will illustrate specific embodiments of the invention, but are not to be considered as limiting its scope.

*Example I*

A modified unsaturated resinous polyester resin is prepared by heating a mixture of 0.5 mol. (49 parts) maleic anhydride, 0.5 mol. (74 parts) phthalic anhydride and 1.2 mol. (92 parts) of propyleneglycol to 190° C. until a clear resinous liquid is obtained.

A sufficient amount of monometric 2-vinylpyridine is mixed, at room temperature, with the resinous polyester to obtain a mass comprising, on a weight basis, the equivalent of 40 parts of the vinylpyridine per each 100 parts of polyester.

Zinc dust is added slowly to the resinous liquid composition, with stirring, until a smooth suspension containing 8 lbs. of the dust per gallon of the composition is obtained.

*Example II*

An unmodified polyester is prepared by heating together equimolecular proportions of triethylene glycol and maleic acid until a partial condensate having the form of a resinous liquid is obtained.

The polyester is mixed, at room temperature, with a sufficient amount of 5-vinyl-2-methylpyridine per 100 parts of the polyester.

Zinc dust is added, with stirring and at a slow rate, until a suspension of 12 lbs. of the dust per gallon of the resinous liquid is obtained.

*Example III*

A modified resinous polyester is prepared by heating a mixture of ingredients as in Example I. The resin is blended with 2-vinylpyridine containing 1% by weight of hydroquinine, to obtain a homogeneous mix containing 30 parts of the vinylpyridine per 100 parts of polyester.

Zinc dust is then stirred in slowly until the suspension contains 12 lbs. of the dust per gallon of the resinous blend.

Small amounts of a catalyst, as described hereinabove, are added to the compositions, which are then coated onto a metal base to be protected against corrosion and hardened to infusible condition. The hardening may be effected at room temperature but is preferably expedited by the use of elevated temperatures which may range from 50° C. to 200° C., or the compositions are introduced into molds and heated to curing temperature in the molds. In molding the compositions, the curing or hardening may be carried out under atmospheric pressure or at higher pressures, such as from 0.5 lbs./sq. in. above atmospheric to 20 lbs./sq. in. (gauge), or even at pressures up to 300–500 lbs./sq. in.

The compositions may be molded in various ways, as for example by pouring into molds formed of wood, rubber, metal, plaster, concrete, etc. and in order to avoid sticking to the mold, the mold surfaces contacted by the composition may be protected with a mold lubricant such as zinc stearate or a natural or synthetic was, or such lubricants may be included in the composition.

Although the invention has been exemplified in terms of the polymerizable compositions containing zinc dust, particulate metals other than zinc may be mixed with or suspended in the polymerizable composition, as has been mentioned hereinabove. Of special interest are such compositions containing aluminum flake.

These compositions have many advantages in the coating arts. The resin, after thermosetting thereof, adheres tenaciously to a metal base and serves as a hard but flexible anchor for the particulate metals so that the protected metal base may be subjected to flexing stress without disturbing the bond between it and the resin and particulate metal. The resin functions as a sealer for the metal particles.

The proportions of polymerizable alkyd and vinyl-substituted heterocyclic tertiaryamine may be selected so that the very finely divided metal particles, in the quantities mentioned herein or in larger quantities, remain substantially uniformly suspended therein and the composition is sprayable and can be applied to serve, for example, as an aluminum "paint." Very finely divided pigments may also be suspended in the vehicle to provide a sprayable thermosettable composition which may be used as a flexible, sprayable one-coat protective and coloring coating composition for various metal substrates which, after application of the composition, may be moved through a baking zone for hardening the resin. This offers the extremely important advantage that any rusting resulting from scratches or abrasions is localized and does not tend to spread because the scratch is surrounded by the anti-corrosive protective metal particles applied to the base with the resin. Various over-coatings may

I claim:

1. A sprayable, liquid, rustproofing coating composition consisting essentially of a polymerizable blend of (1) a liquid, potentially thermosetting component which consists essentially of a reaction product of an alpha-unsaturated-alpha, beta-dicarboxylic acid and a polyhydric alcohol, with (2) from 5 to 50 parts by weight, per 100 parts of said liquid reaction product, of substantially monomeric 2-vinylpyridine, the liquid blend containing, per gallon thereof, from 5 to 18 lbs. of particles of a metal selected from the group consisting of zinc, aluminum, titanium, magnesium, zirconium and lithium having a diameter between about 0.5 and 3.0 microns.

2. A sprayable, liquid rustproofing coating composition consisting essentially of a polymerizable blend of (1) a liquid potentially thermosetting component which consists essentially of a reaction product of maleic anhydride, phthalic anhydride and propylene glycol with (2) from 5 to 50 parts by weight, per 100 parts of said liquid reaction product, of substantially monomeric 2-vinylpyridine, the blend containing, per gallon thereof, from 5 to 18 lbs. of zinc dust.

References Cited in the file of this patent

UNITED STATES PATENTS

| | | |
|---|---|---|
| 2,576,392 | Downes | Nov. 27, 1951 |
| 2,600,457 | Wynstra | June 17, 1952 |
| 2,642,404 | Pike | June 16, 1953 |
| 2,645,626 | Nordlander | July 14, 1953 |
| 2,664,413 | Parker | Dec. 29, 1953 |